United States Patent [19]

Voelskow

[11] 4,265,408

[45] May 5, 1981

[54] SORTING MACHINE

[76] Inventor: Peter Voelskow, Kiefernweg 18, 6550 Bad Kreuznach, Fed. Rep. of Germany

[21] Appl. No.: 51,364

[22] Filed: Jun. 25, 1979

[30] Foreign Application Priority Data

Sep. 12, 1978 [DE] Fed. Rep. of Germany ....... 2839604

[51] Int. Cl.³ .......................................... B02C 17/02
[52] U.S. Cl. ....................................... 241/87; 241/91; 241/167; 241/178; 241/228; 241/236; 241/278 A
[58] Field of Search ...................... 241/83, 85, 86, 87, 241/88.1, 89.2, 91, 167, 178, 179, 183, 228, 229, 236, 278 A, 284; 209/683

[56] References Cited

U.S. PATENT DOCUMENTS

| 3,021,008 | 2/1962 | Christian | 241/87 X |
| 3,061,205 | 10/1962 | Lavallee | 241/85 X |
| 3,144,939 | 8/1964 | Yoshikwa | 209/683 X |
| 4,032,075 | 6/1977 | Tyer, Sr. | 241/183 X |
| 4,154,407 | 5/1979 | Lamort | 241/87 X |

FOREIGN PATENT DOCUMENTS 197709 9/1977 U.S.S.R. .................................. 241/228

Primary Examiner—Howard N. Goldberg
Attorney, Agent, or Firm—Michael J. Striker

[57] ABSTRACT

A classifying and sorting machine for refuse particles, particularly household refuse and other refuse having a composition resembling household refuse, has a rotatable screen drum the diameter of which is within the range of 1:1–1:2 relative to its axial length. Baffles of sawtooth-shaped configuration are arranged in the drum rotating with the same and having inwardly directed ripping teeth. Annular baffles in the drum subdivide the drum into two or more axially adjacent compartments and each have an inner diameter smaller than the inner diameter of the drum, and an arrangement is provided for rotating the drum at an angular velocity which is smaller by between about 20–50% than the velocity at which the drum contents are pressed by centrifugal force against the circumferential drum wall.

12 Claims, 8 Drawing Figures

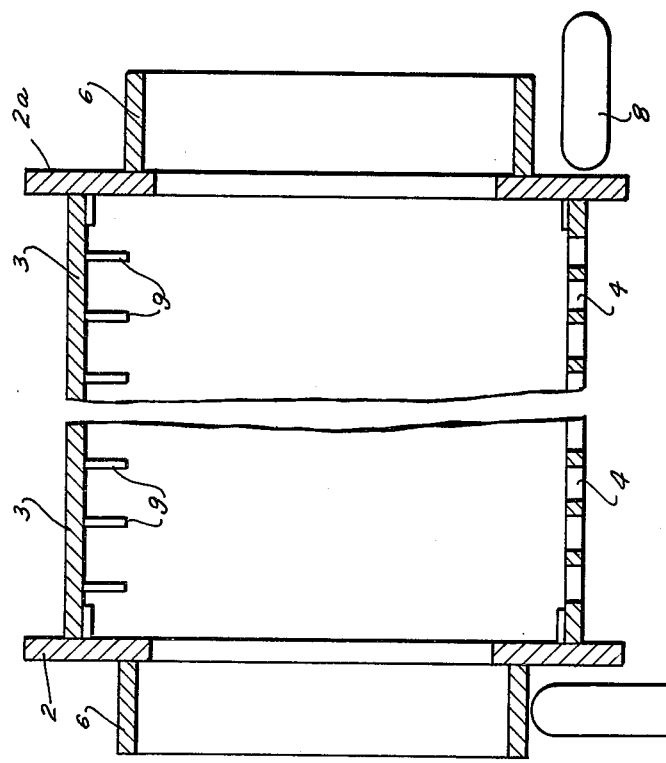
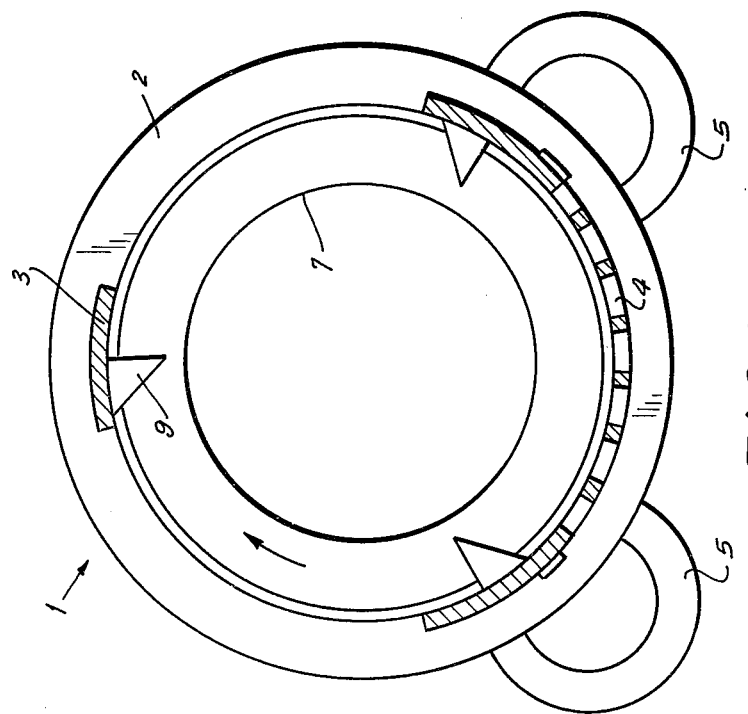

SORTING MACHINE

BACKGROUND OF THE INVENTION

The present invention relates to a drum-type sorting machine, particularly for domestic refuse and for commercial refuse having a composition approximating that of domestic refuse.

More particularly, the invention relates to a drum-type sorting machine which is provided with built-in refuse comminuting devices.

Generally speaking, screen-type machines are capable only of producing a classification but not a sorting of mixes of materials. Vol. 1, "Material Recycling aus Haushaltsabfall", Prof. Dipl.-Ing. Bernhard Jaeger and Prof. Dr.-Ing. K.J. Thoma-Kozmiensky, pp 254–274. Only the selected size reduction of individual types of materials within the material mix permits certain sorting processes to be carried out with a screen-type machine.

Furthermore, a classification for classifying sorting of refuse mixtures requires a preliminary partial size reduction (i.e. comminution) of compressed refuse cubes, filled paper and plastic bags or the like. This size reduction heretofore has always required a separate operating step.

All screen-type machines used for these purposes, including drum-type screen machines for processes of household refuse, tend to become clogged by the exceptionally heterogeneous material to be processed. To clean drum-type screen machines it is known to provide rotating brush rollers which continuously brush against the inner circumferential surface and/or the outer circumferential surface of the drum to brush off adhering material. Ibid., p 263. Drum cleaning devices of this type heretofore could be used only with relatively small drum sizes and relatively small screen openings. In the screen drum constructions which have been known in the art heretofore, in which the length of the drum is a multiple of its diameter, drums having a length of between about 8–12 meters are needed if significant amounts of material are to be processed per unit of time. In this type of construction it is, of course, not possible to have a shaft extend through the interior of the drum with brushes on it to brush the inside surface of the drum, because the shaft cannot be supported within the confines of the drum and over such a great length tends to oscillate uncontrollably. Moreover, shaft-mounted rotary cleaning brushes can only be used for pre-comminuted refuse and in conjunction with relatively small screen openings, because in the event of non-comminuted refuse or only partially comminuted refuse, larger textile scraps or pieces of synthetic plastic foil would become round around the rotary brush and prevent the same from proper operation.

SUMMARY OF THE INVENTION

Accordingly, it is an object of the present invention to overcome the disadvantages of the prior art.

A more particular object of the present invention is to provide a classifying and sorting refuse-handling screen-drum machine which is not possessed of the aforementioned advantage.

Still more particularly, it is an object of the present invention to provide a machine of the type in question which is capable of having a high throughput of material per unit time and a large screen-drum surface, but which nevertheless permits the arrangement of screen cleaning elements within the drum and even, if necessary, the arrangement of selectively effective material comminuting devices within the drum.

An additional object of the invention is to provide a machine of the type in question wherein comminuting elements are provided which tear open plastic and paper bags, and compressed refuse cubes or bricks.

Another object of the invention is to provide such a machine which is capable of effecting classifying sorting even of non-comminuted refuse, since the comminuting costs for such refuse are relatively high.

Still a further object of the invention is to provide a machine of the type in question having cleaning devices which continuously and automatically remove—even in the case of very large-sized screen openings—such materials as textile scraps, synthetic plastic foils, pieces of garden branches or the like which tend to become trapped in the screen openings, in order to keep the screen cleared at all times.

Pursuant to these objects, and others which will become apparent hereafter, one aspect of the invention resides in a sorting machine, particularly for refuse particles, which comprises a rotatable screen drum having a diameter within the range of 1:1 to 1:2 relative to its axial length, and a plurality of circumferentially spaced strip-shaped baffles arranged in and rotatable with the drum. The baffles extend lengthwise of the drum parallel to the axis of rotation of the same and have inwardly directed ripping portions. A plurality of axially spaced annular baffles are also provided in the drum and each of these has an inner diameter smaller than the inner diameter of the drum, and means are provided for rotating the drum at an angular velocity which is smaller by between about 20–50% than the velocity at which the drum contents are pressed by centrifugal force against the circumferential drum wall.

For the selectively effective size-reduction (i.e. comminution) of brittle but hard materials contained in the refuse mix, such as glass, porcelain, pieces of tile or brick and the like, a shaft is mounted which extends through the drum and rotates at relatively low speed, extending parallel to the axis of the drum and being provided with impact surfaces or impact blades onto which the material impacts as it is taken up by the drum along one side during rotation and drops down and onto the blades.

To clean the screen segments, particularly screen segments having large-size screen openings, of such substances as textile scraps, synthetic plastic foils, branches from garden refuse and the like, a further shaft extends through the drum which is provided with approximately S-shaped hook-shaped elements each of which moves between two of these sawtooth-shaped members of the baffles, and the tips of which point counter to the direction of drum rotation, which hook-shaped elements are periodically advanced by turning of the shaft on which they are mounted so as to travel through interstices of a stripping comb which removes adhering substances from them.

To comminute paper and cardboard contained in the refuse mix and soaked in water or the like, arms are mounted in the drum on one or more shafts which also mesh with the sawtooth-shaped baffles in the drum and effect the desired comminution.

Between the end flanges at the drum ends and the screen segments un-perforated longitudinally extending rods or beams are mounted the radial inner surfaces of which are shaped to correspond to the curvature of the drum and on which the sawtooth-shaped baffles are mounted in rows, for example by welding.

Between the end flanges at the ends of the drum and any intermediate flanges which might be provided to subdivide the interior of the drum into several axially successive sections, and the longitudinally extending beams mentioned above, the screen segments constituting the circumferential screen wall of the drum, are mounted so that they can be readily removed, for example by securing them from the exterior with the aid of screws.

The drum has end rings which are not perforated and the outer circumferential surfaces of which are engaged by drum-supporting and drum-driving wheels,—preferably but not necessarily truck or fork-lift wheels with pneumatic tires mounted on them. These supporting and drive rings are arranged axially outside the end flanges of the drum and have a center opening communicating with the interior of the drum. The rings preferably have a smaller diameter than the diameter of the circumferential wall of the drum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a cross section in somewhat diagrammatic form, through a drum of a machine according to the present invention;

FIG. 2A is a vertical cross section of FIG. 1 taken close to the front axial surface thereof;

FIG. 2B is a vertical cross section of FIG. 1 taken close to the rear axial surface thereof;

DESCRIPTION OF THE PREFERRED EMBODIMENTS

Figure 4:
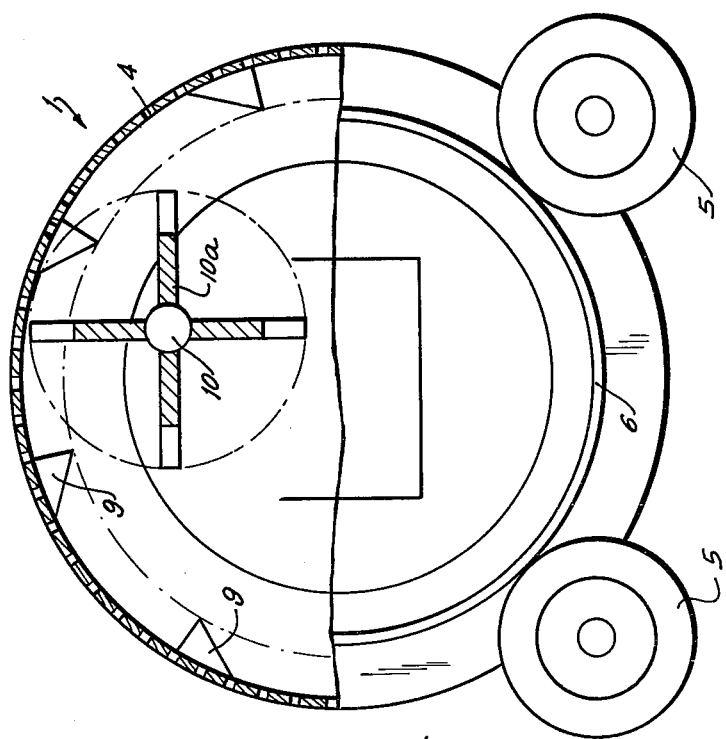
FIG. 4 is a cross section through FIG. 3.

Referring now to the drawing in detail, and firstly to FIGS. 1 and 2A and 2B, it will be seen that reference numeral 1 identifies the screen drum of a machine according to the present invention. The drum 1 has axially spaced end flanges 2 and 2a which are connected by longitudinally extending rods or beams 3 which form a part of the circumferential wall of the drum and preferably have a cross section (compare FIG. 1) corresponding to the cross section of a segment of a cylinder. Mounted on these beams 3 and the end flanges 2 are screen segments 4 so that they can be readily individually exchanged; the connection can be effected by means of screws from the exterior of the drum and some of the segments are shown by way of example at the bottom half of the illustration in FIG. 1.

FIGS. 2A and 2B show particularly clearly that the drum is provided at its axial ends, outwardly adjacent the flanges 2 and 2a, with supporting and driving rings 6 which are secured to the flanges 2 and 2a outside the range of the screen segments, for example by welding or in any other suitable manner. The rings 6 are preferably of a significantly smaller diameter than the outer circumferential wall of the drum composed of the elements 3, 4 and the inlet and outlet openings 7 at the flanges 2 and 2a, through which the refuse is admitted at one end and remainders are removed at the other end, also have a smaller diameter than the outer diameter of the circumferential drum wall 3, 4 and thus prevent axial spill-over of the material from out of the drum 1.

In operation the drum, which is supported on wheels 5, preferably truck wheels or forklift wheels provided with pneumatic tires and connected with a suitable drive, is so mounted that its longitudinal axis of rotation is somewhat inclined to the horizontal. The drum is supported by a supporting wheel 8 which is in rolling contact with the drum flange 2a at the outlet side or outlet end of the drum 1.

Mounted on the beams 3 on the interior of the drum, as pickups for the material in the drum and at the same time as devices to effect preliminary size reduction for the material, are baffles 9 which are sawtooth-shaped and preferably cooperate (mesh) with not illustrated stirring arms, slotted fling plates, cleaning devices or the like.

Figure 3:
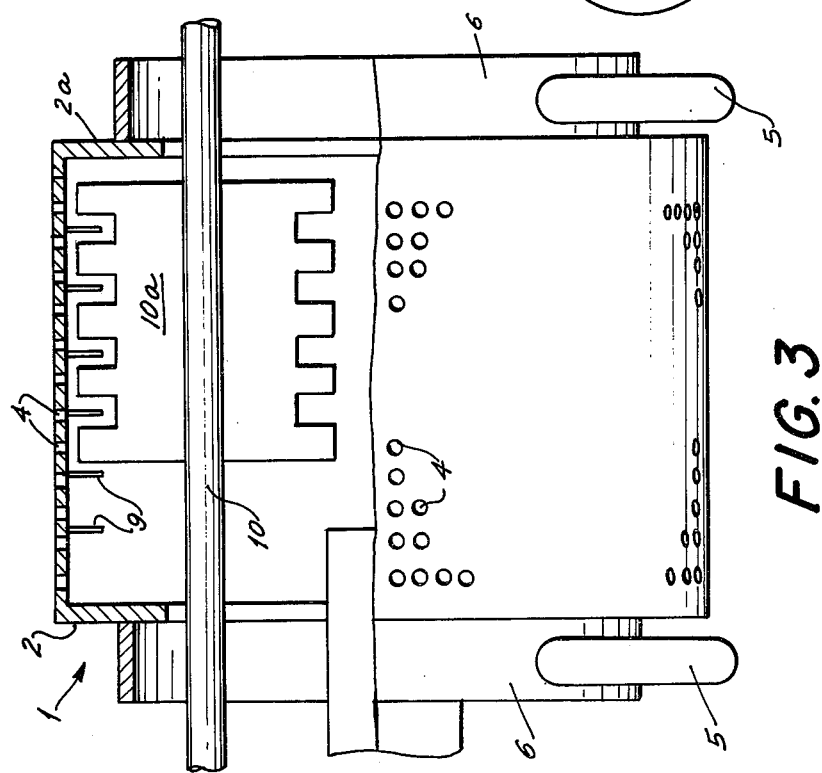
FIG. 3 is an axial section through the machine according to a further embodiment of the invention.

An analogous embodiment is illustrated in FIGS. 3 and 4, but has a shaft 10 extending through the drum parallel to and laterally offset from the axis of rotation of the same. The shaft 10 is provided with one or more plates or the like 10a having impact surfaces so that, when the shaft 10 rotates and the plates rotate with it, they impact the material in the drum and help to comminute it, i.e. reduce it in size. In the illustrated embodiment the plate 10 is provided in its outer edges with incisions or slots which cooperate with the sawtooth-shaped members or baffles 9.

Figure 6:
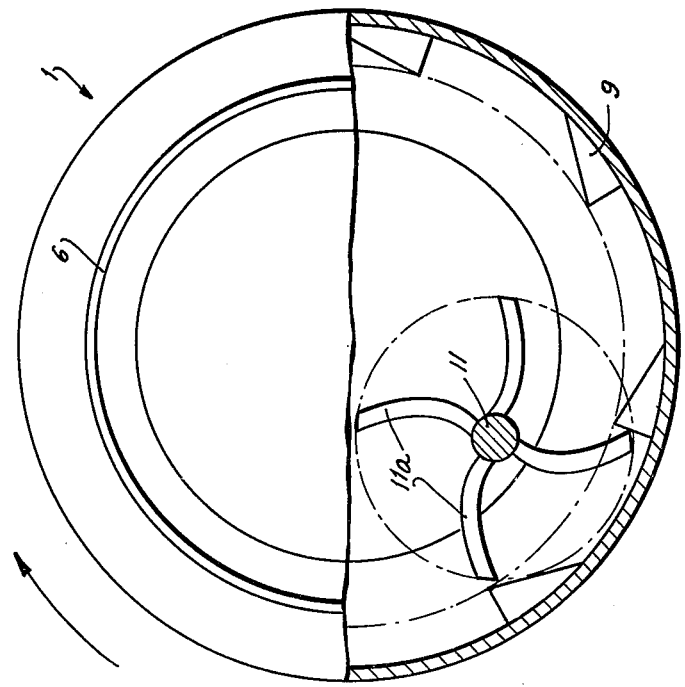
FIG. 6 is a cross section through FIG. 5.
Figure 5:
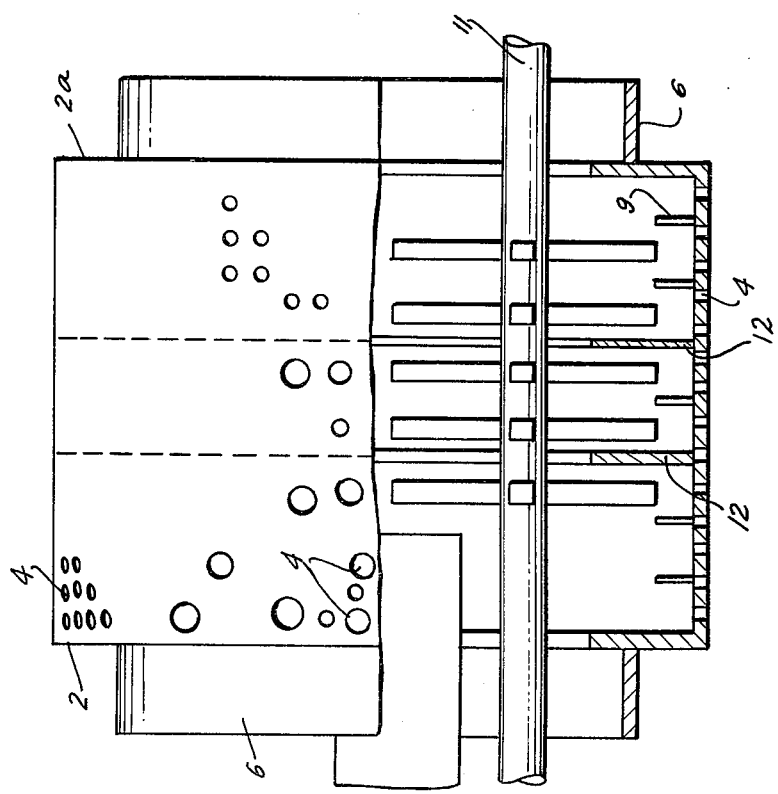
FIG. 5 is a somewhat diagrammatic axial section through a further embodiment of the invention.

In the embodiment of FIGS. 5 and 6, which is again somewhat reminiscent with the one in FIGS. 3 and 4, a shaft 11 similar to the shaft 10 extends through the drum, axially of the same and parallel to its axis of rotation. It is provided for transversely extending agitating arms or braids 11a which again cooperate with the sawtooth-shaped comminuting baffles 9. In addition, this embodiment is subdivided by an annular circumferentially extending inner flange 12 into two axially spaced compartments, in which the screen segments forming the major part of the outer circumferential wall of the drum may have openings of different sizes, i.e. in one compartment the openings may be smaller and in the other compartment the openings of the screen may be larger.

Figure 7:
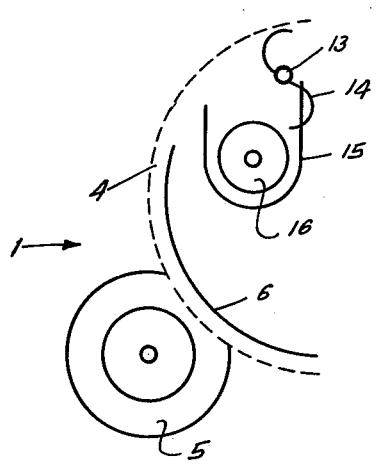
FIG. 7 is a diagrammatic cross section through an additional embodiment of the invention.

FIG. 7, finally, illustrates an embodiment in rather diagrammatic form, wherein the drum—or rather the end rings 6 thereof, of which only one is fragmentarily shown—is supported on the wheels 5 (one shown) and rotates counterclockwise. Extending through the interior of the drum is a shaft 13 which carries axially spaced (only one shown) S-shaped hook-like elements 14 whose tips face counter to the direction of rotation of the drum. The shaft 13 is rotated only intermittently in relation to the rotation of the drum, with the tips of elements 14 being located close enough to the inner circumferential surface of the screen segments 4 so that the elements 14 pick any material (such as textile scraps, pieces of synthetic plastic foil or the like) out of the screen openings in which they may have become caught and take it along, whereupon they then pass between the interstices of the tines of a stripping comb 15 (shown only in end view) so that the material adhering to them is stripped off and drops away, e.g. onto a conveying screw 16 extending to the outside of the drum.

The present invention provides a device which is exceedingly robust in its construction, particularly by comparison to e.g. airstream classifying machines or the like, and which permits to a large extent sorting of the extremely heterogeneous refuse mix derived from households or from those branches of commerce having household-like refuse.

Particularly important is the axially short, compact construction of the screen drum itself, due to which it is possible—even in machines built for large material throughput per unit time—to use shafts extending through the drum for cleaning and/or comminuting purposes without having to fear that the shafts undergo excessive oscillations within the confines of the drum. Given the relatively short drum length but large drum diameter it is desirable to limit the axial flow of the material through the drum, i.e. to retard it, and for this purpose annular flanges may be used (such as the one shown at reference numeral 12 in FIG. 5, of which of course there may be more than one per drum) which can subdivide the interior of the drum into two or more axially adjacent compartments, and in each compartment the size of the screen openings may be different from the other compartments.

A particularly good utilization of the screen surface of the drum is obtained by a particularly high circumferential velocity of the drum, which causes the material to be lifted almost to the upper dead center point of the drum circumference so that it drops down through the middle of the drum. This strong and constant turnover of the refuse material, and the attendant constant loosening of the refuse, makes it possible to provide the impact plates or surfaces 10a (FIG. 3) which, when they impact hard brittle material such as glass, porcelain or the like, break these up into small particles, so that this selectively size-reduced material can be segregated, i.e. removed in that it is able to pass out through the openings in the screen wall of the drum. Upper refuse, for example organic refuse or metallic refuse, is not or not significantly size reduced even though it impacts the plates 10a which rotate at only relatively low speed, but as far as the hard brittle materials are concerned the effect on them is approximately the same as though the refuse mix containing them were dropped onto a cement floor from a height of about 10 meters.

Making the circumferential screen wall of the drum of individual screen segments and using the beams connecting these segments and connecting also the end flanges of the drum, has a number of advantages. It permits the sawtooth-shaped baffles to be mounted (e.g. bolted or screwed) on the beams, and in the rectangular openings between the beams and the end flanges or intermediate flanges the screen segments can be readily mounted, for example by connecting them from the outside of the drum by means of screws or the like. Thus, damage to the screen segments can be replaced with new ones if and when required and even the screening effect over the length of the drum (e.g. in different compartments into which the drum may be subdivided) can be changed by simply exchanging screen segments having holes of one size for screen segments having holes of a different size.

While the invention has been illustrated and described as embodied in a classifying and sorting machine for refuse, it is not intended to be limited to the details shown, since various modifications and structural changes may be made without departing in any way from the spirit of the present invention. It will be appreciated that the several different measures shown in the various embodiments can also be combined in a single embodiment.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sorting machine, particularly for refuse particles comprising a rotatable screen drum having a diameter within the range of about 1:1 to 1:2 relative to its axial length; a plurality of axially spaced annular sets of strip shaped baffles arranged in and rotatable with said drum, and having inwardly directed ripping portions; a plurality of axially spaced annular baffles in said drum and each having an inner diameter smaller than the inner diameter of the drum; means for rotating said drum at an angular velocity which is smaller by between about 20-50% than the velocity at which the drum contents are pressed by centrifugal force against the circumferential drum wall; and at least one turnable processing shaft extending through said drum parallel to and laterally offset from the axis of rotation of said drum.

2. A sorting machine as defined in claim 1, said ripping portions being sawtooth-shaped portions.

3. A sorting machine as defined in claim 1 wherein said turnable processing shaft has spaced end portions projecting beyond and journalled outside the respective ends of the drum.

4. A sorting machine as defined in claim 3; and further comprising a plurality of impact surfaces axially spaced on said processing shaft for impacting material being processed in the drum.

5. A sorting machine as defined in claim 3; further comprising hook-shaped formations on siad processing shaft turnable therewith and having pointed ends facing counter to the direction of drum rotation for removing matter adhering to the circumferential drum wall; a stripping comb extending along said processing shaft and cooperating with said hook-shaped formation for stripping matter off the same; and means for periodically turning said processing shaft with reference to said stripping comb.

6. A sorting machine as defined in claim 5, wherein said hook-shaped formations are S-shaped elements.

7. A sorting machine as defined in claim 3; and further comprising a plurality of arms mounted on and turnable with said processing shaft and cooperating with said ripping portions of said strip-shaped baffles for ripping up material in said drum.

8. A sorting machine as defined in claim 1, said drum having axially spaced sections wherein the circumferential drum wall is provided with apertures of respectively different sizes, at least some of said annular baffles separating successive ones of said sections from one another.

9. A sorting machine as defined in claim 1; further comprising imperforate bars extending lengthwise in and rotatable with said drum, said bars having radially inner surfaces on which said stripshaped baffles are mounted.

10. A sorting machine as defined in claim 1, wherein the circumferential wall of said drum is composed of a plurality of individually detachable screen segments.

11. A sorting machine as defined in claim 1, said drum including axially spaced end rings; and further comprising drive wheels frictionally engaging outer circumferential surfaces of said end rings for thereby rotating said drum.

12. A sorting machine as defined in claim 11, said end rings having a diameter smaller than the diameter of said drum.

* * * * *